(No Model.) 2 Sheets—Sheet 1.

A. M. TODD.
MACHINE FOR HARVESTING PEPPERMINT PLANTS.

No. 584,969. Patented June 22, 1897.

Witnesses:
Walter S. Wood
D. Eldred Wood

Inventor,
Albert M. Todd
By Fred L. Chappell
Att'y.

(No Model.) 2 Sheets—Sheet 2.

A. M. TODD.
MACHINE FOR HARVESTING PEPPERMINT PLANTS.

No. 584,969. Patented June 22, 1897.

Witnesses:
Walter S. Ward
D. Eldred Wood

Inventor,
Albert M. Todd
By Fred L. Chappell
Att'y.

UNITED STATES PATENT OFFICE.

ALBERT M. TODD, OF KALAMAZOO, MICHIGAN.

MACHINE FOR HARVESTING PEPPERMINT-PLANTS.

SPECIFICATION forming part of Letters Patent No. 584,969, dated June 22, 1897.

Application filed February 10, 1896. Serial No. 578,789. (No model.)

*To all whom it may concern:*

Be it known that I, ALBERT M. TODD, a citizen of the United States, residing at the city of Kalamazoo, in the county of Kalamazoo and State of Michigan, have invented a certain new and useful Machine for Harvesting Peppermint-Plants, of which the following is a specification.

My invention relates to improvements in machines for cutting and harvesting peppermint-plants and plants of a similar character.

In the cultivation of peppermint-plants it is almost impossible to keep the ground entirely level. It will accumulate close to the rows of the plants and form ridges at that point, and when there is a rank growth of the plants they lodge between the rows and it consequently is not possible to cut them and secure all of the plant available for the production of oil with a mowing-machine or reaper as ordinarily constructed.

The objects of this invention are to provide in connection with a mowing-machine a device which will raise the peppermint high enough from the ground so that it can all be cut and secured; and it is the object of this invention also to produce a power-machine which will accomplish this very desirable result along with other and minor objects appearing definitely in the detailed description. I accomplish these objects of my invention by the mechanism and means described in the following specification and shown in the accompanying drawings, in which—

Figure 1:
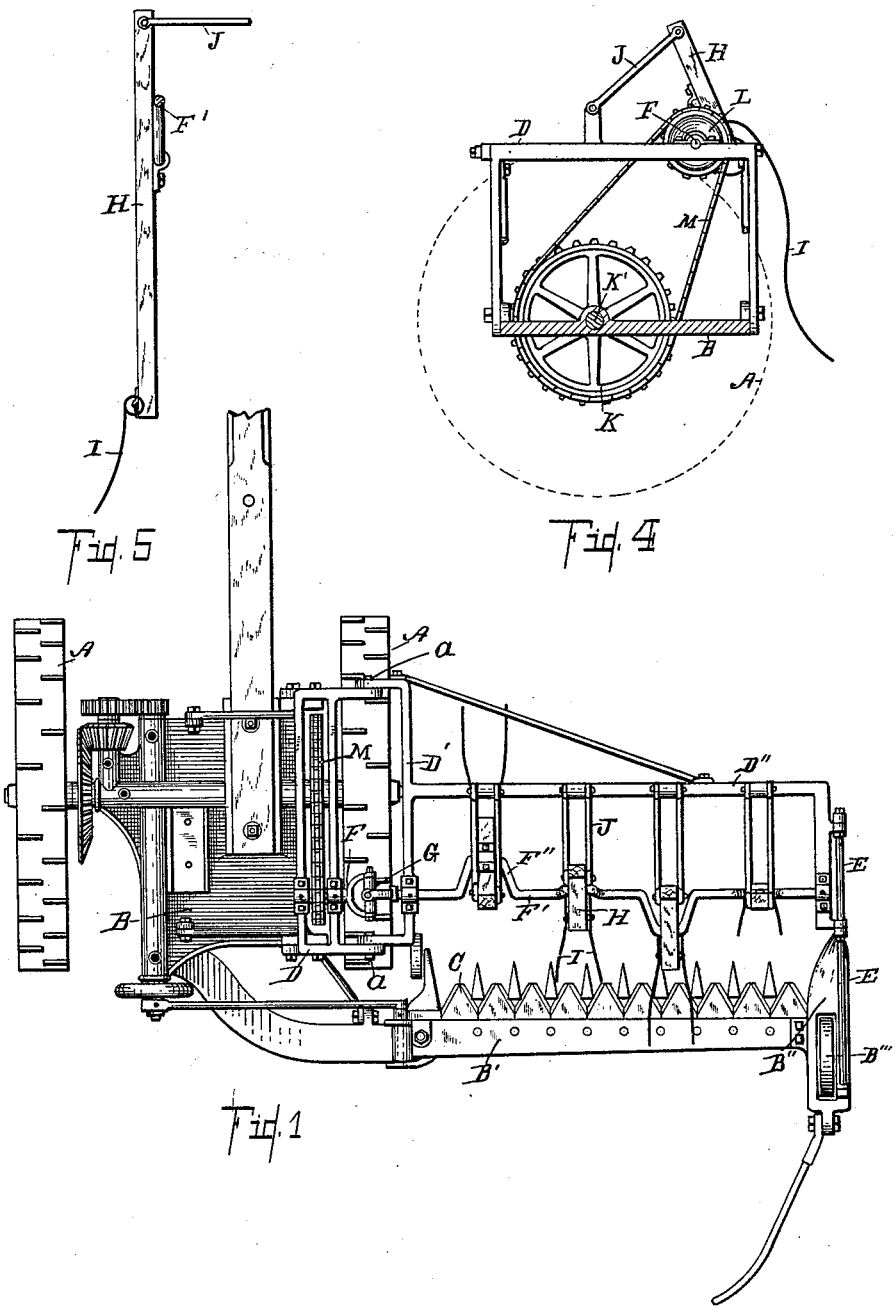
Figure 2:
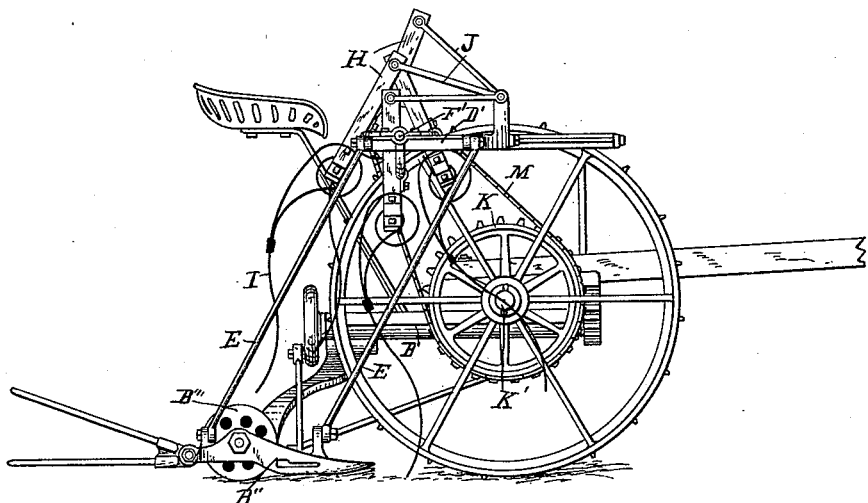
Figure 3:
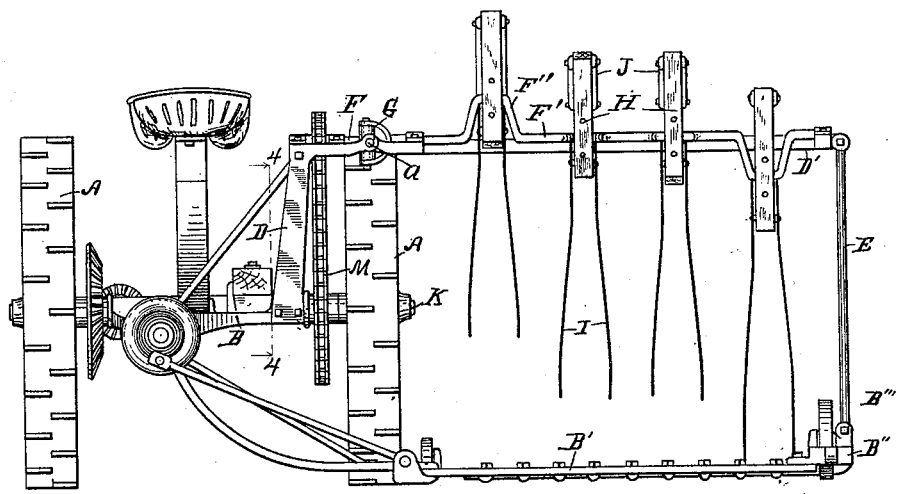

Figure 1 is a top plan view of the machine embodying all the features of my invention, the seat and adjusting-levers not being shown. Fig. 2 is a side elevation of the same, looking from the right. Fig. 3 is a rear elevation of the same. Fig. 4 is a sectional view on line 4 4 of Fig. 3, looking in the direction of the little arrows at the end of the section-line, the position of the driving-wheel being indicated by the dotted line. Fig. 5 is a detail view of a modified form of lifting-fork which can be substituted for those shown in the main drawing.

In the drawings similar letters of reference refer to similar parts throughout the several views.

Referring to the lettered parts of the drawings, A A represent the driving-wheels of the machine. B is the main frame. C is the cutter-bar, which plays in a suitable finger-bar B'. These are constructed and united together much after the fashion of an old-style rearcut mowing-machine. The finger-bar B' is jointed near the heel of the cutter-bar, and the usual track-clearer B'' is provided at the outer end of the same. I also provide a carrying-wheel B''' at this point.

I secure to the frame B an auxiliary framework D by suitable braces which project upwardly just inside of the driving-wheel. A small sprocket-pinion L is supported on a short shaft F at the top of this frame D and is actuated from the sprocket-wheel K on the main driving-shaft K' of the machine. The sprocket-chain M connects them together. A bar D'', having a cross-piece D', is pivoted at *a a* to the frame D, so that it will swing up and down. The outer end of this bar D' is bent rearwardly and is secured by parallel links E E to the track-clearer B'', the joints being so formed that the bar D' can only move up and down in the vertical direction. A shaft F' extends across and above the path of the cutter-bar in a position parallel to the bar D'' and is supported in suitable bearing-boxes at each end. This shaft F' is a crank-shaft having a series of cranks F''' formed therein at intervals at equal distances from each other around the shaft, there being four of these cranks F''' in this instance. Pivoted on these cranks are arms or bars H, terminating at their lower ends in this instance in long tines I, of steel. The upper ends of the arms H are pivotally connected by double links J to the bar D''', and when the shaft F' is in rotation these tines operate in substantially the same manner as the forks on a hay-tedder. The shaft F' is connected by a universal joint G to the shaft F, which is actuated from the main shaft of the machine, as heretofore indicated.

The hinging of the bar D'' and the finger-bar B' affords the machine an opportunity to adjust itself to the varying conditions and unevenness of the ground over which the machine passes.

It will be readily understood that in operation the machine will pass over the row of peppermint and that the tines I will assume the various positions indicated in Fig. 2 as the shaft F' is rotated, and will engage the plants in front of the cutter-bar and lift them off the ground, so that the cutter-bar will have an opportunity to cut all of them close to the ground. The track-clearer E will have formed a track for the machine the next time and the process will be repeated in much the same manner as with an ordinary mowing-machine. The cutter-bar and the lifting devices in front of the same operate to produce a perfect harvesting-machine for valuable plants of this character.

The exact form and dimensions of the lifting-tines I are not material, as will readily be understood from an inspection of Fig. 5, in which a modification is shown. No doubt tines or other lifting devices can be operated in different ways in front of the cutter-bar of a mowing-machine to accomplish this result, and the exact construction here shown might be greatly varied.

I do not wish to be confined in my patent to the exact construction here shown. The lifting devices could no doubt with some difficulty be supported in front of the cutter-bar of a mowing-machine having what is known as a "front" cut, but it is obvious that the construction here shown will be much the most convenient and satisfactory.

From these statements it will be readily understood that the construction of my improved machine can be greatly varied in its details without departing from my invention.

Having thus described my invention, what I claim as new, and desire to secure by Letters Patent, is—

1. In a machine for cutting peppermint, the combination of the driving-wheels A; the main frame B of the machine carrying finger-bar B' to the rear; the cutter-bar operating in said finger-bar, an auxiliary frame D supported on the main frame B; the shaft F thereon actuated by a suitable sprocket-gear from the main shaft; a projecting arm D" bent toward the rear at its outer end and having a cross-piece D' hinged to the frame D at its inner end; links E, E, connecting the outer end thereof to the outer end of the finger-bar; crank-shaft F' connected to shaft F by universal joint G with a series of cranks F" thereon located at intervals around the shaft, downwardly-projecting arms H terminating in tines I at the bottom, supported on said cranks F"; links J connecting the top of said arms H to the bar D", so that the tines will be actuated similar to tedder-tines in front of the cutter-bar of the machine to lift the plants so that they will be cut close to the ground, all coacting together substantially as described for the purpose specified.

2. In a machine for cutting peppermint or similar plants, the combination of a mowing-machine, an auxiliary framework projecting upwardly therefrom; the bar D" hinged thereto with a joint nearly opposite the joint at the heel of the finger-bar; link connections E, E, from the outer end of the bar D" to the outer end of the finger-bar; a crank-shaft F' above and in front of the cutting-bar of the machine; downwardly-projecting arms H with tines at the bottom supported on said cranks; link connections from the tops of the arms to the bar D"; and a universal-joint connection between the crank-shaft F' and the gearing on the main machine for actuating the same, as specified.

3. In a mowing-machine for cutting peppermint or similar plants, the combination of the usual cutter-bar, a series of tedder or lifting tines in front thereof positioned to act successively and suitable gearing for actuating said tines to elevate the mint in front of the cutter-bar, coacting as specified.

In witness whereof I have hereunto set my hand and seal in the presence of two witnesses.

ALBERT M. TODD. [L. S.]

Witnesses:
 WALTER S. WOOD,
 CORA W. FULFORD.